United States Patent [19]

McNally et al.

[11] Patent Number: 5,059,471
[45] Date of Patent: Oct. 22, 1991

[54] INLAID TILE

[75] Inventors: Michael H. McNally, New Windsor; Walter C. Timm, Cornwall; Bruce J. Terwilliger, Newburgh; James A. Perrego, New Windsor, all of N.Y.

[73] Assignee: Tarkett AB, Ronneby, Sweden

[21] Appl. No.: 309,231

[22] Filed: Feb. 13, 1989

[51] Int. Cl.$^5$ .................. B32B 5/16; D06N 7/04; C04B 14/00
[52] U.S. Cl. ..................... 428/143; 428/147; 428/156; 428/167; 428/172; 428/206; 428/207; 428/212; 428/217; 428/327; 428/402; 428/423.3; 428/424.2; 428/518; 428/521; 428/542.2; 106/400; 106/902; 106/904
[58] Field of Search .............. 428/143, 144, 147, 149, 428/156, 161, 163, 167, 168, 172, 206, 207, 220, 323, 327, 333, 340, 357, 412, 412.24, 409, 542.2, 212, 217, 423.3, 424.4, 518, 521; 106/84, 97, 400, 902, 903, 904, 401, 493; 156/219

[56] References Cited

U.S. PATENT DOCUMENTS

| | | | |
|---|---|---|---|
| 3,687,800 | 9/1922 | Scheppers | 428/143 |
| 4,348,447 | 9/1982 | Miller et al. | 428/143 |
| 4,418,109 | 11/1983 | Miller et al. | 428/143 |
| 4,460,635 | 7/1984 | Jones et al. | 428/150 |
| 4,662,972 | 5/1987 | Thompson | 428/143 |

*Primary Examiner*—Ellis P. Robinson
*Assistant Examiner*—Donald J. Loney
*Attorney, Agent, or Firm*—Nies, Kurz, Bergert & Tamburro

[57] ABSTRACT

A tile composition having a unique appearance created by the use of inlaid particles over an embossed and printed pattern is disclosed. In preparing the tile product, a first layer of UV curable coating is applied over the entire upper surface of a tile base. An excess of particles or chips is then sprinkled onto the surface of the first coating layer and the non-adhering particles are removed. The first layer is subjected to curing and a second layer of UV curable coating is then applied over the particles and the first layer followed by a second curing step. In one embodiment, the second coating is obtained by a combination of coating methods, including one or more direct roll coating steps followed by a curtain coating step. The particles or chips should preferably include chips of three types: (a) pigmented base color chips of which about 77 to 100 weight percent are of a U.S. mesh size in the range of between 60 and 200; (b) clear chips of which about 77 to 100 weight percent are of a U.S. mesh size in the range of between 60 and 200; and (c) accent color chips of which about 90 to 100 weight percent are of a U.S. mesh size in the range of between 40 and 200.

10 Claims, 1 Drawing Sheet

INLAID TILE

BACKGROUND AND SUMMARY OF THE INVENTION

The present invention relates to a tile composition having a unique appearance created by the use of inlaid particles over a flat or embossed and printed pattern or pigmented tile base. More particularly, the process and product of the present invention relate to an embossed or flat and printed tile base, typically about 62 to 125 mils thick, on which a layer of UV curable coating is applied over the entire surface area of the tile. Upon this layer, sufficient particles or chips which may be both clear and pigmented are sprinkled to complete hiding. The particulate material that does not adhere to the coating is removed and the assembly is cured under UV light which cures the coating surface including the surface beneath some of the individual particles. In this manner, adhesion of the coating to the chips is obtained, thus providing a base for subsequent operations which include application of a second layer of UV curable coating by roll coating and/or curtain coating which results in the second layer adhering to the particles when cured with UV radiation. The principal advantages of the invention are the unique three-dimensional appearance and the increase of abrasion resistance due to the manner in which the particles or chips are employed.

DESCRIPTION OF THE PREFERRED EMBODIMENTS

Figure 1:
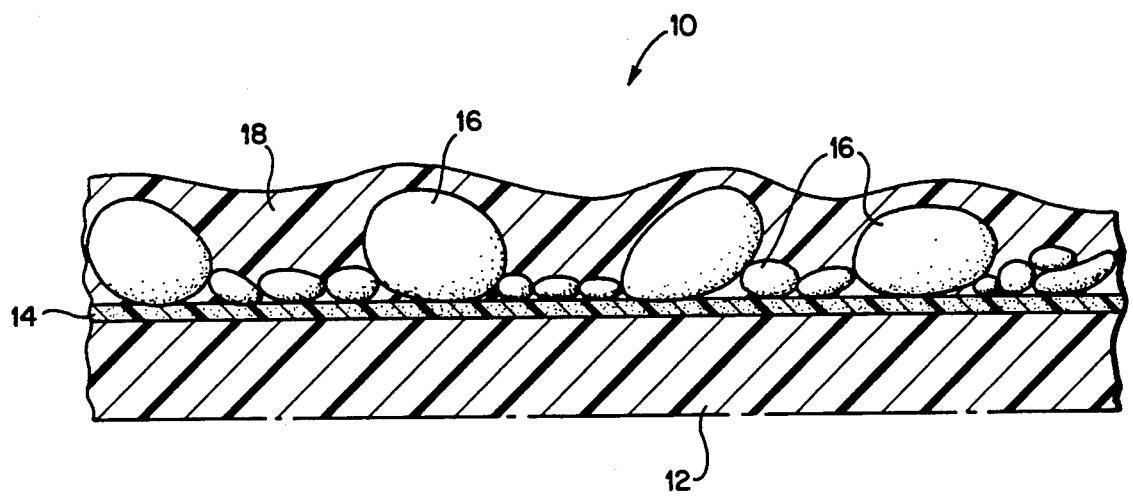
FIG. 1 is an enlarged cross-sectional view of a portion of the tile composition of the present invention, containing the first adhesive coating, the particles and the top coat.
Figure 2:
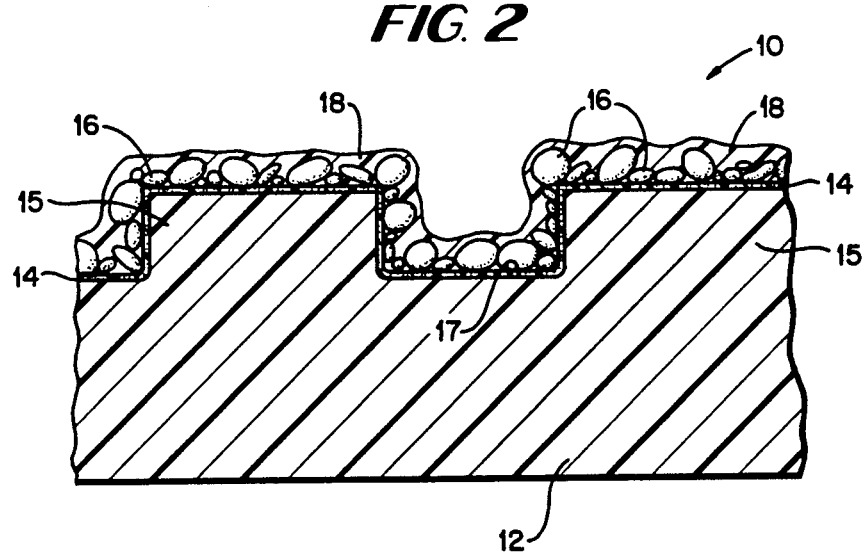
FIG. 2 is a cross-sectional view of an embossed tile showing the first coating, the particles and the top coat applied over the entire surface of the embossed tile base.

In the embodiment of the invention as shown in FIGS. 1 and 2, there is provided a tile composition 10 having a tile base 12 which is embossed and printed with raised areas 15 and depressed areas 17. In preparing the tile composition, the base 12 is subjected to brushing and vacuum, after which a first layer 14 of UV curable coating is applied to the base 12 by use of equipment such as a direct roll coater. An excess of particles or chips 16 is then sprinkled on the layer 14 by the use of a siever duster or similar equipment. After sprinkling of the chips 16, a vacuum system is used to remove the excess chips before curing. Curing of the first layer 14 is then carried out in a nitrogen atmosphere under UV radiation, and a rotary brush with vacuum is then employed to remove any non-adhered chips. A second layer 18 of UV curable coating is then applied over the particles 16 and the first layer 14, after which coating 18 is completely cured under UV radiation in a nitrogen atmosphere. The second layer 18 of UV curable coating may be applied by the use of a combination of coating methods. Thus, for example, in a preferred method, a pair of direct roll coaters may be employed in sequence, after which a curtain coater is employed for the application of a final coat. Upon completion of the second curing step, the tile product is passed to a stainless steel cooling belt.

In carrying out the method for obtaining the tile composition of the present invention, the embossed and printed tile base 12 may be any suitable filled tile base, such as that formed of a vinyl polymer, including a homopolymer, a copolymer or a combination of the two. The tile base may also be formed of polypropylene or polybutylene materials or other polymeric resin. The base may also be a ceramic tile or continuous sheets. The manufacture of the tile base can be carried out by any of various methods such as extrusion, calendering or pressing. The first layer of UV curable coating is applied over the entire pattern of the tile base and thus the specific design of the embossed and printed tile base is not of particular importance to the invention.

The present invention is intended to include wall coverings as well as floor tiles and thus is generally concerned with imparting an enhanced appearance to any of various types of base materials. In addition, it is not required that the base material be embossed or printed as a unique three dimensional appearance is provided even without such pretreatment as a result of the application of the coatings and particles in accordance with the present invention.

The particles or chips 16 employed in the invention may be formed of a resin material such as a vinyl polymer or an acrylic or ABS material. The particles or chips 16 may include resin materials both clear and pigmented. The particles or chips 16 are generally present in the form of three categories or types of chips, these being (a) pigmented base color chips, (b) clear chips and (c) accent color chips.

The pigmented base color chips include particles in which the major portion, about 77 to 100 wt. percent, has a U.S. mesh size of between 60 and 200 mesh, and including an additional portion of 0 to 8 wt. percent of a size which is retained on a 60 U.S. mesh screen and a portion of 0 to 15 wt. percent which passes through a 200 U.S. mesh screen. The pigmented base color chips may include particles of a single color, or a combination of various colors, such as red, green, blue, white and black pigmented resin.

The clear chips include particles in which the major portion, about 77 to 100 wt. percent, has a U.S. mesh size of between 60 and 200 mesh, and including an additional portion of 0 to 8 wt. percent of a size which is retained on a 60 U.S. mesh screen and a portion of 0 to 15 wt. percent which passes through a 200 U.S. mesh screen. The clear chips are formulated of a vinyl polymer such as PVC homopolymer along with a plasticizer such as butyl benzyl phthalate (BBP) and a UV stabilizer such as one of the calcium-zinc or other types known in the art. No pigment is included. In one embodiment, the clear chips are formed of 74.8 wt. percent PVC homopolymer, 22.2 wt. percent BBP and 3.0 wt. percent stabilizer.

The accent color chips, which are generally of a larger size, include particles in which the major portion, about 90 to 100 wt. percent, has a U.S. mesh size of between 40 and 200 mesh, and including an additional portion of 0 to 5 wt. percent of a size which is retained on a 40 U.S. mesh screen and a portion of 0 to 5 wt. percent which passes through a 200 U.S. mesh screen. In a preferred embodiment, an amount of accent color chips of from about 20 to 50 wt. percent is of a size which is retained on a 60 U.S. mesh screen. The accent color chips may include particles of a single color, or a combination of various colors of pigmented resin.

In preparing the resin chips, there is mixed together a dry blend of a vinyl polymer such as PVC homopolymer, a plasticizer, a thermal and UV stabilizer and a paste of the desired pigment in accordance with procedures known in the art. In the case of the clear chips, no pigment paste is employed. The materials of the blend may be mixed in a dry blend mixer at temperature less then the polymer fusion temperature to form particles coated with pigment. Alternatively, the materials may be mixed in an intensive mixer to the point of fusion, then sheeted out and ground to the desired particle size.

The composition of chips employed in the inlaid tile of the present invention includes from about 0 to 76 wt. percent of pigmented base color chips, about 20 to 100 wt. percent of clear chips and about 4 to 6 wt. percent of accent color chips. An amount of at least about 20 wt. percent clear chips is needed in order to allow transmission of UV light in an amount sufficient to obtain curing of the first layer of UV curable coating and thus provide adhesion of the first layer of coating to the chips. In this regard, it has been found that red pigmented chips prepared in accordance with the present invention have the same UV transmission properties as unpigmented or clear chips. Thus the properties of clear chips as described hereinafter will also apply to red pigmented chips and chips of other pigments which transmit UV radiation.

As discussed above, the colors of the chips are selected so as to obtain at least an amount of UV transmission through the particles sufficient to allow curing of the first layer of coating beneath such particles as well as in the voids between particles. This is in addition to the factors of chip color selection which provide a tile product having the enhanced three dimensional appearance and abrasion resistance. With regard to such UV transmission, it has been found that colored particles or chips prepared in accordance with the present invention will totally absorb UV light with no transmission through to the coating, in the case of all colored chips except red chips. As to chips which are clear with no pigment, such chips will transmit all UV light having a wavelength above 340 nanometers (nm) and with some transmission between 300 and 340 nm. For wavelengths below 300 nm, the clear and red chips are opaque with no transmission of UV light. The major emission lines of a medium pressure mercury lamp are 255 nm, 265 nm, 302 nm, 313 nm and 365 nm. Thus such a lamp will provide the needed wavelengths of UV light.

In carrying out the first UV curing step, it is important that sufficient UV energy be transmitted through and between the particles so that curing of the first layer of UV curable coating is obtained sufficient to cause adhesion of the clear chips to the base. As a result of the curing process, the coating tends to shrink around the chips and thus hold the pigmented chips firmly to the coating by mechanical adhesion. Upon subsequent application of the second coating with curing under UV conditions, the second coating becomes adhered to the particles so as to provide a firm bonding throughout the tile product.

With regard to the size of the particles or chips 16 employed, it has been found that if the particles are larger than the sizes as described above, a heavy second coat is required so that the process becomes expensive and also there is a greater tendency for the product to curl. If the particles are of a size smaller than the above ranges, the product tends to lose its attractive three dimensional appearance. By employing chips or particles 16 of various sizes, as the particles fall on the surface of the UV curable coating, the particles of different sizes will fill in the voids between particles and create an interesting multi-layered pattern having the illusion of depth.

In one embodiment, it is possible to obtain a "pearlescent" appearance through the use of pearlescent-type particles which may be arsenates or synthetic materials.

With regard to the use of pigmented or colored particles, in one embodiment dry, blended vinyl particles are employed in a mixture of colors as described hereinafter. It is also within the scope of the invention to employ color coated inorganic materials such as silica materials. However, the use of resin materials is advantageous since control of color is thereby provided. The dry blended vinyl chips employed in a preferred embodiment have a Shore D hardness range of 45 to 60 and a Mohs hardness of about 1.

The particles or chips employed may be of a generally spherical shape, as most resin particles will have such a shape. However, it is within the scope of the invention to employ particles having the shape of platelets, such as talc, mica, or ground polymeric particles or to employ needle shaped particles such as the silica materials.

By the use of particles or chips of various sizes distributed throughout the ranges as described herein, the process obtains an arrangement of particles as shown in FIG. 1, with the top coating 18 penetrating down and around both the small and large particles to achieve the desired three dimensional effect with the enhanced appearance of depth of the product.

With regard to the sprinkling of the particles or chips to obtain complete hiding, the entire coated tile surface is covered so that wherever there is UV curable adhesive coating, some of the particles will adhere. In order to obtain complete coverage, excess chips in the amount of 5 to 200 percent will be sprinkled on the coating and with the non-adhering chips being removed prior to curing. Thus whatever particles are not adhered to the coating will be removed prior to curing, since if layers of particles were left on the coating, the material will not cure properly. This is due to the fact that layers of particles will increase the probability of UV blocking pigmented particles covering the clear particles.

In carrying out the first curing step, the top surface of the particles or chips 16 will be above the top surface of the first layer 14 of UV curable coating and there may be approximately 1 mil or more of coating between adjacent particles. During the curing step, the coating located beneath the particles 16 which do not transmit UV light will not be cured since it is not subjected to UV radiation and thus this portion of the coating will remain tacky. The UV curable coating employed for both the first 14 and second 18 coatings may be a conventional UV curable coating material such as acrylourethane coatings. Other coating materials which may be employed for either the first or second coatings include the UV curable epoxies or polyesters. Both the first and second curing steps are carried out in the absence of air, such as in a nitrogen atmosphere.

In covering the entire surface of the embossed and printed tile base with the UV curable coating, any of various methods may be employed such as roll coating, spray coating, or curtain coating, with direct roll coating being the preferred method. An important aspect of the present invention is that complete coverage of the tile base is achieved by the first UV curable coating so that when the particles of various sizes fall on any portion of the pattern of the base, the particles will firmly adhere to the base.

The process of the invention may be carried out either "on-line" with coating and curing, followed by cutting of the material into tiles, or "off-line" in which the base material is precut into tiles followed by coating and curing. In one embodiment, the process is carried out by the "on-line" procedure up to application of the first coating, and then "off-line" for the remainder of the process.

The second or top coat 18 may be applied by roll coating or curtain coating with roll coating being preferred as such a procedure allows the top coat to penetrate completely into the spaces between the particles, while the curtain coating procedure tends to result in the coating forming a bridge across the particles. As previously mentioned, it is also within the scope of the present invention to employ a combination of coating methods to produce the second coating. Thus one or more direct roll coating steps may be carried out followed by a curtain coating step, in producing the second or top coat 18.

In one embodiment of the invention, the process includes application of a first UV curable coating to the base material, followed by application of particles after which the material is subjected to a vacuum procedure to remove the excess particles. The material is then cured in a nitrogen atmosphere with the first coating remaining slightly tacky due to the fact that UV radiation does not impinge upon the coating 14 beneath some of the particles 16. After the first curing procedure, the material is subjected to brushing and vacuum followed by the second coating step by which the top coat 18 is applied. The second coating step may include the application of several coats with, for example, one or two layers being applied by roller coating after which a additional layer is applied by curtain coating. The second coating may also be applied by spray coating if desired. Upon completion of the second coating step, the material is then subjected to complete curing in the absence of air.

In the application of the first UV curable coating, roller coating equipment is preferably employed, although curtain coating or spray coating could also be employed. The particles are applied by the use of a feeder such as a siever duster or rotating drum which applies an excess of particles in order to provide complete coverage over the surface of the first curable coating. The excess particles may be removed by any conventional type of vacuum device. The UV curing equipment may be conventional equipment employed in the art.

The tile base 12 is generally at room temperature upon commencing the process of the invention and the various coatings employed are at a temperature sufficient to provide a viscosity of about 200 to 400 cps for each of the various coatings employed.

In carrying out the UV curing steps, there may be employed a 100 to 300 watts per inch lamp such as a medium pressure mercury lamp with spectral bands of 313 and 365 nm. The line speeds employed may be in the range of about 80 to 120 feet per minute up through application of the first coating, and with a line speed of about 130 to 150 feet per minute during the steps of brushing, the second coating and second curing steps.

The following example is intended to provide an illustrative embodiment of the invention without limiting the scope thereof.

EXAMPLE 1

A conventional vinyl compositional tile base from 80 to 100 mils thick which was embossed and printed was fed into a direct roll coater where a UV curable adhesive was applied.

The adhesive coated tile was then sprinkled with an excess of compounded vinyl chips of various colors and clear. The vinyl chip coated tile was then passed under a vacuum system to remove the excess chips. After removing the excess chips, the chip covered tile with 3 to 7 grams of chips per square foot was passed under a UV radiation source which cured the adhesive. Following this step, the tile was then passed under a rotary brush with air jets which removed any non-adhered chips.

The vinyl chip coated tile was then fed through two direct roll coaters which each applied 3 to 7 grams per square foot of a UV curable coating. The tile was then conveyed through a curtain coater where a UV curable wearlayer was applied (6 to 12 grams per square foot). The coated tile was next passed under a UV radiation source where the coating was completely cured.

EXAMPLE 2

In a further embodiment of the invention, a UV curable adhesive layer was applied to a decorative plastic base of the invention by roller coating at a temperature of about 140° F. and a viscosity preferably between 200 and 400 cps at an application of between 0.5 and 1.5 mils, 1.5 to 4 grams per square foot. The adhesive was a UV urethane radiation curable material with a photoinitiator added with UV absorption above 300 nm.

An excess of plastic chips was applied to the adhesive layer followed by removal of part of the excess chips by vacuum while maintaining the base still completely covered. The plastic chips were formulated so that UV radiation above 300 nm was not absorbed in the case of at least about 20 percent by weight of the total chip composition. This was achieved by selecting chips of a particular size and with a particular ratio of pigmented to non-pigmented chips as described previously. The UV adhesive was cured in a nitrogen atmosphere by passing UV radiation above 300 nm through the chips. The ratio employed to achieve the proper cure included:

| Chip composition | weight percent |
| --- | --- |
| Clear chips | 20 |
| Accent color chips | 5 ± 1 |
| Pigmented base color chips | 75 |

The balance of the excess chips was removed by brushing, thus providing a monolayer of chips which was adhered to the base by the cured UV adhesive. A top urethane wear coating was then applied over the chips, and this top coating was also cured by UV radiation in a nitrogen atmosphere.

The particle sizes employed for the chips were as follows:

| Screen Size | Clear | Base Color | Accent Color |
| --- | --- | --- | --- |
| Retained on 60 Mesh US | 8% Max | 8% Max | 20% Min- |

| Screen Size | Clear | Base Color | Accent Color |
|---|---|---|---|
| Through 200 Mesh US | 15% Max | 15% Max | 50% Max 5% Max |

A typical screen analysis for these chips was as follows:

| | | % Retained | | |
|---|---|---|---|---|
| Screen Size | Particle Size Microns | Clear | Base Color[1] | Accent Color[2] |
| 40 | 420 | Trace | 0 | .6% |
| 60 | 250 | Trace | 0 | 22.8% |
| 80 | 177 | 11.1% | 8.8% | 30.2% |
| 100 | 149 | 21.1% | 21.4% | 38.1% |
| 140 | 105 | 51.9% | 54.0% | 6.8% |
| 200 | 74 | 11.5% | 13.6% | 1.5% |
| PAN | — | 4.4% | 2.2% | 0% |
| Total | | 100.0 | 100.0 | 100.0 |

Note:
[1] Base color white
[2] Accent color red

The following formulations have been employed in preparing inlaid tile compositions of the present invention:

| | wt. % |
|---|---|
| BLACK BLEND | |
| Red[2] | 2.0 |
| Green[2] | 2.0 |
| Blue[2] | 2.0 |
| White[1] | 0.5 |
| Ebony[1] | 73.5 |
| Clear | 20.0 |
| | 100.0 |
| LT. BLUE BLEND | |
| Red[2] | 0.2 |
| Green[2] | 0.8 |
| Blue[2] | 1.1 |
| Black[2] | 1.9 |
| Lt. Blue[1] | 30.0 |
| Clear | 26.0 |
| White[1] | 40.0 |
| | 100.0 c |
| TEAL BLEND | |
| Red[2] | 0.2 |
| Green[2] | 0.8 |
| Blue[2] | 1.1 |
| Black[2] | 1.9 |
| Teal[1] | 40.0 |
| Clear | 26.0 |
| White[1] | 30.0 |
| | 100.0 |
| ROSE TAUPE | |
| Red[2] | 0.2 |
| Green[2] | 0.8 |
| Blue[2] | 1.1 |
| Black[2] | 1.9 |
| Rose Taupe[1] | 30.0 |
| Clear | 26.0 |
| White[1] | 40.0 |
| | 100.0 |
| GREY BLEND | |
| Red[2] | 0.2 |
| Green[2] | 0.8 |
| Blue[2] | 1.1 |
| Black[2] | 1.9 |
| Grey[1] | 30.0 |
| Clear | 26.0 |
| White[1] | 40.0 |
| | 100.0 |
| WHITE BLEND | |
| Red[2] | 0.2 |
| Green[2] | 0.8 |
| Blue[2] | 1.1 |
| Black[2] | 1.9 |
| White[1] | 48.0 |
| Clear | 48.0 |
| | 100.0 |

Note:
[1] Base color chip
[2] Accent color chip

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A floor covering comprising a plastic base having a first layer of UV cured coating applied to the upper surface of said plastic base, with particulate materials adhered to said first layer and with said first layer and said particulate materials being covered by a second layer of UV cured coating, each of said first and second layers of UV cured coating being cured in the absence of air, wherein said particulate materials are selected from the group consisting of vinyl polymer, acrylic and ABS materials as the major component of said particulate materials, said particulate materials including at least about 20 weight percent of the total particulate materials of clear chips, said clear chips being capable of transmission of at least a portion of the UV light having a wavelength of 300 nanometers or above, and wherein about 77 to 100 weight percent of said clear chips are of a U.S. mesh size in the range of between 60 and 200.

2. The floor covering of claim 1 wherein said clear chips are capable of transmission of all UV light having a wavelength above 340 nanometers and being capable of transmission of at least a portion of the UV light having a wavelength between 300 and 340 nanometers.

3. The floor covering of claim 1 further including about 4 to 6 weight percent of the total particulate materials of about color chips of a pigmented material, wherein about 90 to 100 weight percent of said accent color chips are of a U.S. mesh size in the range of between 40 and 200, and wherein an amount of accent color chips of from about 20 to 50 weight percent is of a size which is retained on a 60 U.S. mesh screen.

4. The floor covering of claim 3 wherein said accent color chips include chips of a plurality of pigmented colors.

5. The floor covering of claim 1 further including pigmented base color chips of which about 77 to 100 weight percent are of a U.S. mesh size in the range of between 60 and 200.

6. The floor covering of claim 5 wherein said pigmented base color chips include chips of a plurality of pigmented colors.

7. The floor covering of claim 1 wherein said plastic base is embossed and printed.

8. The floor covering of claim 1 wherein said particulate materials have a Shore D hardness range of 45 to 60.

9. The floor covering of claim 1 wherein said clear chips are formulated of a vinyl polymer, a plasticizer and a UV stabilizer.

10. The floor covering of claim 9 wherein said vinyl polymer is polyvinyl chloride.

* * * * *

UNITED STATES PATENT AND TRADEMARK OFFICE
CERTIFICATE OF CORRECTION

PATENT NO. : 5,059,471

DATED : October 22, 1991

INVENTOR(S) : McNally et al.

It is certified that error appears in the above-identified patent and that said Letters Patent is hereby corrected as shown below:

Column 8, line 43:
Claim 3, line 3, cancel "about", insert --accent--.

Signed and Sealed this

Second Day of February, 1993

Attest:

STEPHEN G. KUNIN

*Attesting Officer*   Acting Commissioner of Patents and Trademarks